United States Patent
Matner et al.

(10) Patent No.: US 12,492,281 B2
(45) Date of Patent: Dec. 9, 2025

(54) POLYISOCYANURATE MATERIALS AS ELECTRICAL POTTING COMPOUNDS

(71) Applicants: Covestro Intellectual Property GmbH & Co. KG, Leverkusen (DE); Covestro Deutschland AG, Leverkusen (DE)

(72) Inventors: Mathias Matner, Neuss (DE); Michael Ehlers, Krefeld (DE); Dirk Achten, Leverkusen (DE); Ralf Rott, Leverkusen (DE); Bengt Arheden, Otterup (DK)

(73) Assignee: Covestro Deutschland AG, Leverkusen (DE)

( * ) Notice: Subject to any disclaimer, the term of this patent is extended or adjusted under 35 U.S.C. 154(b) by 993 days.

(21) Appl. No.: 17/429,379

(22) PCT Filed: Feb. 26, 2020

(86) PCT No.: PCT/EP2020/055037
§ 371 (c)(1),
(2) Date: Aug. 9, 2021

(87) PCT Pub. No.: WO2020/174009
PCT Pub. Date: Sep. 3, 2020

(65) Prior Publication Data
US 2022/0127407 A1    Apr. 28, 2022

(30) Foreign Application Priority Data
Feb. 27, 2019    (EP) ..................... 19159839

(51) Int. Cl.
| C08G 18/10 | (2006.01) |
| C08G 18/16 | (2006.01) |
| C08G 18/22 | (2006.01) |
| C08G 18/28 | (2006.01) |
| C08G 18/48 | (2006.01) |
| C08G 18/73 | (2006.01) |
| C08G 18/76 | (2006.01) |
| C08K 3/36 | (2006.01) |
| B29C 39/10 | (2006.01) |
| B29K 75/00 | (2006.01) |
| B29L 31/34 | (2006.01) |

(52) U.S. Cl.
CPC .......... *C08G 18/10* (2013.01); *C08G 18/161* (2013.01); *C08G 18/168* (2013.01); *C08G 18/225* (2013.01); *C08G 18/2825* (2013.01); *C08G 18/4825* (2013.01); *C08G 18/73* (2013.01); *C08G 18/7671* (2013.01); *C08K 3/36* (2013.01); *B29C 39/10* (2013.01); *B29K 2075/00* (2013.01); *B29L 2031/3406* (2013.01)

(58) Field of Classification Search
CPC .. C08K 3/36; C08K 2201/009; C08G 18/022; C08G 2115/02
See application file for complete search history.

(56) References Cited

U.S. PATENT DOCUMENTS

| 3,487,080 A | 12/1969 | Yutaka et al. |
| 3,996,223 A | 12/1976 | Gupta et al. |
| 4,040,992 A | 8/1977 | Bechara et al. |
| 4,255,569 A | 3/1981 | Mueller et al. |
| 4,265,798 A | 5/1981 | Mishra |
| 4,288,586 A | 9/1981 | Bock et al. |
| 4,324,879 A | 4/1982 | Bock et al. |
| 4,379,905 A | 4/1983 | Stemmler et al. |
| 4,419,513 A | 12/1983 | Breidenbach et al. |
| 4,487,928 A | 12/1984 | Richter et al. |
| 4,499,253 A | 2/1985 | Kerimis et al. |
| 4,604,418 A | 8/1986 | Shindo et al. |
| 4,789,705 A | 12/1988 | Kase et al. |
| 4,837,359 A | 6/1989 | Woynar et al. |
| 4,960,848 A | 10/1990 | Scholl et al. |
| 4,994,541 A | 2/1991 | Dell et al. |
| 5,013,838 A | 5/1991 | Scholl |
| 5,064,960 A | 11/1991 | Pedain et al. |
| 5,076,958 A | 12/1991 | Pedain et al. |
| 5,489,663 A | 2/1996 | Brandt et al. |
| 5,914,383 A | 6/1999 | Richter et al. |
| 6,090,939 A | 7/2000 | Richter et al. |
| 6,107,484 A | 8/2000 | Richter et al. |
| 6,613,863 B2 | 9/2003 | Kohlstruk et al. |
| 6,635,761 B1 | 10/2003 | Revelant et al. |
| 7,001,973 B2 | 2/2006 | Kohlstruk et al. |
| 7,067,654 B2 | 6/2006 | Richter et al. |
| 7,091,341 B2 | 8/2006 | Revelant et al. |

(Continued)

FOREIGN PATENT DOCUMENTS

| CA | 2034622 A1 | 8/1991 |
| CA | 2139535 A1 | 8/1995 |

(Continued)

OTHER PUBLICATIONS

HPF 8054. Quarzwerke GmbH. High Performance Fillers in Epoxy Resin for Use in Medium High-Voltage Technology <LI-BROCH High Performance Fillers Epoxy Resin in Medium High Voltage Tech.pdf> (Year: 2016).*
Unispar Technical Data. "Micronised Feldspar Fillers: Features and Benefits". Sibelco Specialty Minerals Europe. https://coatings.sibelcotools.com/wp-content/uploads/2017/03/Unispar-PG-W13-W20_TDS_POVIGLIO_03-05-2013_EN.pdf (Year: 2013).*
European Polymer Journal (1980) 16: pp. 147-148.

(Continued)

*Primary Examiner* — Michael M Dollinger
(74) *Attorney, Agent, or Firm* — The Webb Law Firm

(57) ABSTRACT

The invention relates to potting compounds which cure to polyisocyanurate plastics, to the production of said potting compounds and to the use of the potting compounds for manufacturing electrical components.

11 Claims, No Drawings

(56) References Cited

U.S. PATENT DOCUMENTS

| | | | |
|---|---|---|---|
| 7,709,680 B2 | 5/2010 | Richter et al. | |
| 8,742,166 B2 | 6/2014 | Lucas et al. | |
| 9,926,402 B2 | 3/2018 | Laas et al. | |
| 10,752,723 B2 | 8/2020 | Laas et al. | |
| 11,236,191 B2 * | 2/2022 | Hocke | C08G 18/3206 |
| 11,279,790 B2 * | 3/2022 | Mager | C09D 175/04 |
| 11,286,331 B2 * | 3/2022 | Klimmasch | C08G 18/289 |
| 11,286,332 B2 * | 3/2022 | Achten | C08G 18/4833 |
| 11,319,402 B2 * | 5/2022 | Hocke | C08G 18/722 |
| 11,530,290 B2 * | 12/2022 | Hocke | C08G 18/725 |
| 2006/0155095 A1 | 7/2006 | Daussin et al. | |
| 2014/0050928 A1 * | 2/2014 | Gebauer | C09D 5/028 427/407.1 |
| 2015/0344726 A1 | 12/2015 | Rademacher et al. | |
| 2017/0044296 A1 * | 2/2017 | Harada | C08G 18/09 |
| 2019/0144592 A1 | 5/2019 | Hocke et al. | |

FOREIGN PATENT DOCUMENTS

| | | | |
|---|---|---|---|
| CA | 2244486 A1 | 2/1999 | |
| DE | 2414413 A1 | 10/1975 | |
| DE | 3240613 A1 | 5/1984 | |
| DE | 102006060357 A1 * | 7/2007 | C08L 83/04 |
| EP | 0013880 A1 | 8/1980 | |
| EP | 0100129 A1 | 2/1984 | |
| GB | 809809 A | 3/1959 | |
| GB | 1145952 A | 3/1969 | |
| GB | 1244416 A | 9/1971 | |
| GB | 1386399 A | 3/1975 | |
| GB | 1391066 A | 4/1975 | |
| GB | 2222161 A | 2/1990 | |
| WO | 2014147072 A1 | 9/2014 | |

OTHER PUBLICATIONS

J. H. Saunders and K. C. Frisch, Polyurethanes Chemistry and Technology, p. 94 ff. (1962).
International Search Report, PCT/EP2020/055037, date of mailing: Apr. 20, 2020, Authorized officer: Christian Wohnhaas.
J. Prakt. Chem. 336 (1994) pp. 185-200.
Justus Liebigs Annalen der Chemie, vol. 562 (1949) pp. 75-136.

* cited by examiner

POLYISOCYANURATE MATERIALS AS ELECTRICAL POTTING COMPOUNDS

CROSS-REFERENCE TO RELATED APPLICATION

This application is a national stage application under 35 U.S.C. § 371 of PCT/EP2020/055037, filed Feb. 26, 2020, which claims the benefit of European Application No. 19159839.0, filed Feb. 27, 2019, each of which is incorporated herein by reference.

FIELD

The present invention relates to potting compounds which cure to afford polyisocyanurate plastics, to the production of said potting compounds and to the use of the potting compounds for production of electrical components.

BACKGROUND

Due to their good insulating properties, plastics are often used for embedding electrical components in order to protect these for example from contamination, moisture or contact. The prior art describes the use of epoxy resins, polyurethanes and silicones to this end.

However, the abovementioned plastics are often synthesized from two components. The mixing ratio of the two components must be precisely observed to obtain optimal qualities.

Polyurethane potting compounds are often based on polymeric methylenedi(phenyl diisocyanate) (MDI) and castor oil. MDI intrinsically has a low viscosity in the range of 200 mPas which makes it possible to incorporate high filler contents. These are desired for reasons of flame retardancy and because of the high costs of the reactants.

The two-component reaction mixtures often also have a short pot life. There is therefore a demand for casting resins which do not have the abovementioned disadvantages.

Plastics obtainable by crosslinking of isocyanate groups with one another are in principle known in the prior art (WO 2015/166983; WO 2016/170059; European Polymer Journal (1980) 16: 147-148). Composite materials containing such plastics as a matrix are disclosed in WO 2017/191175.

US 2015/0344726 describes reaction mixtures having a high NCO/OH ratio and a high filler content. However, these mixtures also contain more than 20% by weight of organic solvents which makes them suitable for producing coatings but not for producing molded articles.

WO 2014/147072 describes reaction mixtures having a high filler content based on bisphenol A diglycidyl ether and diphenylmethane diisocyanate, i.e. an aromatic polyisocyanate. Crosslinking of the reaction mixture is not effected through formation of isocyanurate groups but rather through reaction of epoxy groups with isocyanate groups to afford oxazolidinones.

SUMMARY

In the present study it has surprisingly been found that the electrical properties of polyisocyanurate plastics, in particular permittivity and loss factor, are advantageous for use in electrical potting compounds. When using suitable fillers the reaction mixture simultaneously exhibited a sufficiently low viscosity to allow production of electrical potting compounds.

In a first embodiment, the present invention therefore provides a casting resin having a molar ratio of isocyanate groups to isocyanate-reactive groups of at least 3:1 and a solvent content of not more than 10% by weight, wherein the casting resin contains
  (i) at least one monomeric or oligomeric polyisocyanate A having an isocyanate content of at least 15% by weight;
  (ii) at least one inorganic filler B containing silicon oxide units having an oil number of not more than 25 g/100 g determined according to DIN EN ISO 787-5 (October 1995) and a Mohs hardness of at least 4; and
  (iii) at least one trimerization catalyst C.

DETAILED DESCRIPTION

A "casting resin" is a reactive resin which contains the above-defined constituents and cures to afford a polyisocyanurate composite material. A polyisocyanurate plastic obtained from the polyisocyanate A forms a polymer matrix in which the inorganic filler B is embedded. The term "casting resin" thus characterizes a reaction mixture in which the above-defined components are present in reactive and mixed form so that the polyisocyanate A may be crosslinked by the trimerization catalyst C. The casting resin according to the invention is advantageously used for embedding of electrical components, i.e. as an electrical potting compound. Complete or partial embedding of electrical components in the casting resin according to the invention is used to achieve protection from environmental influences, protection from contact and also electrical insulation or mechanical stabilization.

Curing of the casting resin affords a polyisocyanurate material. This is a composite material made up of a polyisocyanurate plastic as the matrix material and an inorganic filler B. It further contains residues of the trimerization catalyst C and optional additives such as UV stabilizers, flow agents or pigments.

The electrical component is preferably selected from the group consisting of transformers, insulators, capacitors, semiconductors, junction sleeves for protecting cable connections and underground cable branch tees.

Polyisocyanurate Plastic

The term "polyisocyanurate plastic" describes a plastic obtained by crosslinking of isocyanate groups with one another. This is achieved when the casting resin contains a catalyst C suitable for this crosslinking and simultaneously has a high molar ratio of isocyanate groups to isocyanate-reactive groups. This has the result that the isocyanate groups very predominantly have only other isocyanate groups available to them as reaction partners. The term "isocyanate-reactive groups" is in the present application to be understood as meaning epoxy, hydroxyl, amino and thiol groups.

The molar ratio of isocyanate groups to isocyanate-reactive groups in the casting resin is preferably at least 3:1, preferably at least 5:1, yet more preferably at least 10:1 and most preferably at least 20:1.

In the production of molded articles high solvent contents in the reaction mixture are disadvantageous since the solvent evaporates and leaves behind cavities or cracks in the molded article. The casting resin according to the invention therefore contains not more than 10% by weight, preferably not more than 5% by weight and more preferably not more than 2% by weight of solvent. The term "solvents" is to be understood as meaning all organic solvents liquid at room temperature and water. Chemical compounds having at least one isocyanate-reactive group as defined hereinabove or at least one isocyanate group are not solvents in the context of the present patent application since they may be crosslinked with the polyisocyanate A via the relevant functional groups.

In the reaction of the reaction mixture to afford the polyisocyanurate plastic at least 50 mol %, preferably at least 60 mol %, particularly preferably at least 70 mol %, in particular at least 80 mol % and very particularly preferably 90 mol % of the free isocyanate groups present in the polyisocyanate A are converted into isocyanurate structural units. The finished polyisocyanurate plastic thus has corresponding proportions of the nitrogen originally present in the polyisocyanate A bound within isocyanurate structures. However, side reactions, especially those to give uretdione, allophanate and/or iminooxadiazinedione structures, typically occur and can even be used in a controlled manner in order to advantageously affect, for example, the glass transition temperature (Tg) of the polyisocyanurate plastic obtained.

Since according to the invention there is a distinct molar excess of isocyanate groups over isocyanate-reactive groups in the reaction mixture, not more than 50 mol %, preferably not more than 30 mol %, particularly preferably not more than 10 mol %, very particularly preferably not more than 5 mol % and in particular not more than 3 mol % of the reactive isocyanate groups present in the reaction mixture will be in the form of urethane and/or allophanate groups in the polyisocyanurate plastic.

Since the inorganic filler may contain only a small amount of moisture as is customary in polyurethane chemistry it is inert toward isocyanate groups and may be disregarded in the abovementioned calculations.

Polyisocyanate A

The term "polyisocyanate" as used here is a collective term for compounds containing two or more isocyanate groups (this is understood by the person skilled in the art to mean free isocyanate groups of the general structure —N═C═O) in the molecule. The simplest and most important representatives of these polyisocyanates are the diisocyanates. These have the general structure O═C═N—R—N═C═O where R typically represents aliphatic, alicyclic and/or aromatic radicals. In the present application the term "polyisocyanate A" refers to the entirety of all compounds present in the reaction mixture which have on average at least two isocyanate groups per molecule. Polyisocyanate A may thus be composed of a single polyisocyanate. However, it may also be a mixture of a plurality of different polyisocyanates. In the context of the embodiments defined hereinbelow polyisocyanate A may also contain additions of isocyanates having an average functionality of less than two.

Because of the polyfunctionality (≥2 isocyanate groups per molecule), it is possible to use polyisocyanates to produce a multitude of polymers (e.g. polyurethanes, polyureas and polyisocyanurates) and low molecular weight compounds (for example those having uretdione, isocyanurate, allophanate, biuret, iminooxadiazinedione and/or oxadiazinetrione structures).

In the present application the term "polyisocyanates" refers to both monomeric and/or oligomeric polyisocyanates. For the understanding of many aspects of the invention, however, it is important to distinguish between monomeric diisocyanates and oligomeric polyisocyanates. Where reference is made in the present application to "oligomeric polyisocyanates", this means polyisocyanates formed from at least two monomeric diisocyanate molecules, i.e. compounds that constitute or contain a reaction product formed from at least two monomeric diisocyanate molecules.

The production of oligomeric polyisocyanates from monomeric diisocyanates is here also referred to as modification of monomeric diisocyanates. This "modification" as used here means the reaction of monomeric diisocyanates to give oligomeric polyisocyanates having uretdione, isocyanurate, allophanate, biuret, iminooxadiazinedione and/or oxadiazinetrione structures.

Thus for example hexamethylene 1,6-diisocyanate (HDI) is a "monomeric diisocyanate" since it contains two isocyanate groups and is not a reaction product of at least two polyisocyanate molecules:

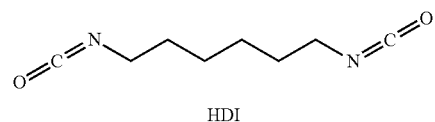

HDI

By contrast, reaction products of at least two HDI molecules which still have at least two isocyanate groups are "oligomeric polyisocyanates" in the context of the invention. Proceeding from monomeric HDI, representatives of such "oligomeric polyisocyanates" include for example HDI isocyanurate and HDI biuret which are each constructed from three monomeric HDI molecules:

(idealized structural formulae)

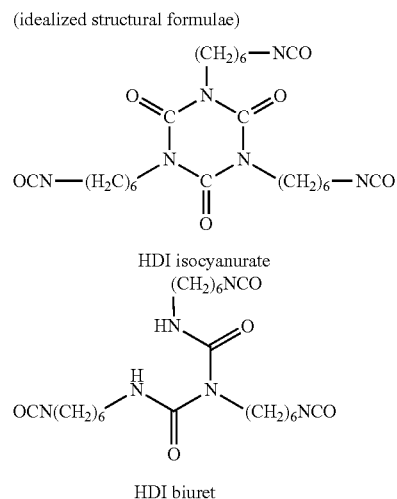

HDI isocyanurate

HDI biuret

According to the invention the proportion by weight of isocyanate groups based on the total amount of the polyisocyanate A is at least 15% by weight.

In principle, monomeric and oligomeric polyisocyanates are equally suitable for use in the reaction mixture according to the invention. The polyisocyanate A may consequently consist essentially of monomeric polyisocyanates or essentially of oligomeric polyisocyanates. However, it may alternatively comprise oligomeric and monomeric polyisocyanates in any desired mixing ratios.

In a preferred embodiment of the invention, the polyisocyanate A used as reactant has a low level of monomers (i.e. a low level of monomeric diisocyanates) and already contains oligomeric polyisocyanates. The terms "low in monomers" and "low in monomeric diisocyanates" are here used synonymously in relation to the polyisocyanate A.

Particularly useful results are obtained when the polyisocyanate A has a proportion of monomeric diisocyanates of not more than 20% by weight, especially not more than 15% by weight or not more than 10% by weight, based in each case on the weight of the polyisocyanate A. It is preferable when the polyisocyanate A has a content of monomeric diisocyanates of not more than 5% by weight, preferably not more than 2.0% by weight, more preferably not more than 1.0% by weight, based in each case on the weight of the polyisocyanate A. Particularly good results are established when the polyisocyanate A is essentially free of monomeric diisocyanates. "Essentially free" here means that the content of monomeric diisocyanates is not more than 0.5% by weight, based on the weight of the polyisocyanate A.

In a particularly preferred embodiment of the invention, the polyisocyanate A consists entirely or to an extent of at least 80%, 85%, 90%, 95%, 98%, 99% or 99.5% by weight, based in each case on the weight of the polyisocyanate A, of oligomeric polyisocyanates. Preference is given here to a content of oligomeric polyisocyanates of at least 99% by weight. This content of oligomeric polyisocyanates relates to the polyisocyanate A as provided. In other words, the oligomeric polyisocyanates are not formed as an intermediate during the process according to the invention, but are already present in the polyisocyanate A used as reactant upon commencement of the reaction.

Polyisocyanate compositions which have a low level of monomers or are essentially free of monomeric isocyanates can be obtained by conducting, after the actual modification reaction, in each case, at least one further process step for removal of the unconverted excess monomeric diisocyanates. This removal of monomers can be effected in a particularly practical manner by processes known per se, preferably by thin-film distillation under high vacuum or by extraction with suitable solvents that are inert toward isocyanate groups, for example aliphatic or cycloaliphatic hydrocarbons such as pentane, hexane, heptane, cyclopentane or cyclohexane.

In a preferred embodiment of the invention, the polyisocyanate A is obtained by modifying monomeric diisocyanates with subsequent removal of unconverted monomers.

However, in a particular embodiment of the invention a polyisocyanate A having a low level of monomers contains an outside monomeric diisocyanate. In this context, "outside monomeric diisocyanate" means that it differs from the monomeric diisocyanates which have been used for production of the oligomeric polyisocyanates present in the polyisocyanate A.

An addition of outside monomeric diisocyanate may be advantageous for achieving specific technical effects, for example a particular hardness. Results of particular practical relevance are obtained when the isocyanate A has a proportion of outside monomeric diisocyanates of not more than 20% by weight, especially not more than 15% by weight or not more than 10% by weight, based in each case on the weight of the polyisocyanate A. It is preferable when the isocyanate A has a content of outside monomeric diisocyanates of not more than 5% by weight, preferably not more than 2.0% by weight, more preferably not more than 1.0% by weight, based in each case on the weight of the polyisocyanate A.

In a further particular embodiment of the process of the invention, the polyisocyanate A contains monomeric monoisocyanates or monomeric isocyanates having an isocyanate functionality greater than two, i.e. having more than two isocyanate groups per molecule. The addition of monomeric monoisocyanates or monomeric isocyanates having an isocyanate functionality greater than two has been found to be advantageous in order to influence the network density of the coating. Results of particular practical relevance are established when the isocyanate A has a proportion of monomeric monoisocyanates or monomeric isocyanates having an isocyanate functionality greater than two in the polyisocyanate A of not more than 20% by weight, especially not more than 15% by weight or not more than 10% by weight, based in each case on the weight of the polyisocyanate A. It is preferable when the polyisocyanate A has a content of monomeric monoisocyanates or monomeric isocyanates having an isocyanate functionality greater than two of not more than 5% by weight, preferably not more than 2.0% by weight, more preferably not more than 1.0% by weight, based in each case on the weight of the isocyanate A. It is preferable when no monomeric monoisocyanate or monomeric isocyanate having an isocyanate functionality greater than two is used in the trimerization reaction according to the invention.

According to the invention the oligomeric polyisocyanates may in particular comprise uretdione, isocyanurate, allophanate, biuret, iminooxadiazinedione and/or oxadiazinetrione structures. In one embodiment of the invention, the oligomeric polyisocyanates have at least one of the following oligomeric structure types or mixtures thereof:

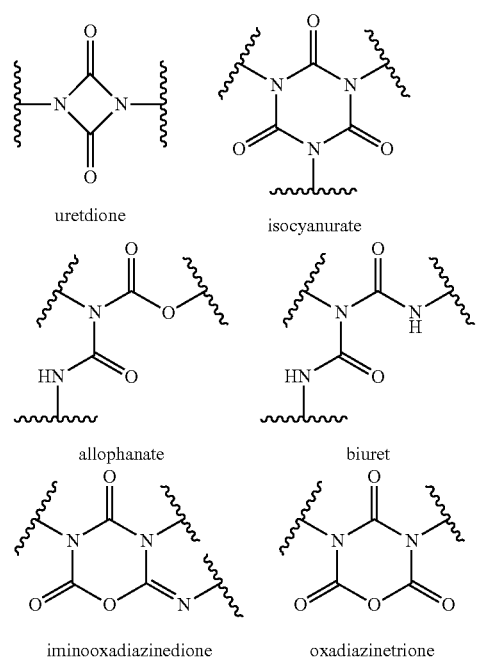

uretdione  isocyanurate allophanate  biuret iminooxadiazinedione  oxadiazinetrione In a preferred embodiment of the invention, a polyisocyanate A is employed whose isocyanurate structure proportion is at least 50 mol %, preferably at least 60 mol %, more preferably at least 70 mol %, yet more preferably at least 80 mol %, yet still more preferably at least 90 mol % and especially preferably at least 95 mol % based on the sum of the oligomeric structures from the group consisting of uretdione, isocyanurate, allophanate, biuret, iminooxadiazinedione and oxadiazinetrione structures present in the polyisocyanate A.

In a further preferred embodiment of the invention the process according to the invention employs a polyisocyanate A containing not only the isocyanurate structure but also at least one further oligomeric structure having a uretdione, biuret, allophanate, iminooxadiazinedione and oxadiazinetrione structure and mixtures thereof.

The proportions of uretdione, isocyanurate, allophanate, biuret, iminooxadiazinedione and/or oxadiazinetrione structure in the polyisocyanate A may be determined for example by NMR spectroscopy. Preferably employable here is 13C NMR spectroscopy, preferably in proton-decoupled form, since the oligomeric structures mentioned give characteristic signals.

Irrespective of the underlying oligomeric structure (uretdione, isocyanurate, allophanate, biuret, iminooxadiazinedione and/or oxadiazinetrione structure), an oligomeric polyisocyanate A for use in the process according to the invention preferably has a (mean) NCO functionality of 2.0 to 5.0, preferably of 2.3 to 4.5.

Results of particular practical relevance are established when the polyisocyanate A for use in accordance with the invention has a content of isocyanate groups of 8.0% to 28.0% by weight, preferably of 14.0% to 25.0% by weight, based in each case on the weight of the polyisocyanate A. Production processes for the oligomeric polyisocyanates having a uretdione, isocyanurate, allophanate, biuret, iminooxadiazinedione and/or oxadiazinetrione structure for use according to the invention in the polyisocyanate A are described, for example, in J. Prakt. Chem. 336 (1994) 185-200, in DE-A 1 670 666, DE-A 1 954 093, DE-A 2 414 413, DE-A 2 452 532, DE-A 2 641 380, DE-A 3 700 209, DE-A 3 900 053 and DE-A 3 928 503 or in EP-A 0 336 205, EP-A 0 339 396 and EP-A 0 798 299.

In an additional or alternative embodiment of the invention, the polyisocyanate A is defined in that it contains oligomeric polyisocyanates which irrespective of the nature of the employed modification reaction have been obtained from monomeric diisocyanates while observing an oligomerization level of 5% to 45%, preferably 10% to 40%, particularly preferably 15% to 30%. "Oligomerization level" is understood here to mean the percentage of isocyanate groups originally present in the starting mixture which are consumed during the production process to form urethane, uretdione, isocyanurate, allophanate, biuret, iminooxadiazinedione and/or oxadiazinetrione structures.

Suitable polyisocyanates for production of the polyisocyanate A for use in the process of the invention and the monomeric and/or oligomeric polyisocyanates present therein are any desired polyisocyanates obtainable in various ways, for example by phosgenation in the liquid or gas phase or by a phosgene-free route, for example by thermal urethane cleavage. Particularly good results are established when the polyisocyanates are monomeric diisocyanates. Preferred monomeric diisocyanates are those having a molecular weight in the range from 140 to 400 g/mol, having aliphatically, cycloaliphatically, araliphatically and/or aromatically bonded isocyanate groups, for example 1,4-diisocyanatobutane (BDI), 1,5-diisocyanatopentane (PDI), 1,6-diisocyanatohexane (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,4-diisocyanato-3,3,5-trimethylcyclohexane, 1,3-diisocyanato-2-methylcyclohexane, 1,3-diisocyanato-4-methylcyclohexane, 1-isocyanato-3,3,5-trimethyl-5-isocyanatomethylcyclohexane (isophorone diisocyanate; IPDI), 1-isocyanato-1-methyl-4(3)-isocyanatomethylcyclohexane, 2,4'- and 4,4'-diisocyanatodicyclohexylmethane (H12MDI), 1,3- and 1,4-bis(isocyanatomethyl)cyclohexane, bis(isocyanatomethyl)norbornane (NBDI), 4,4'-diisocyanato-3,3'-dimethyldicyclohexylmethane, 4,4'-diisocyanato-3,3',5,5'-tetra methyldicyclohexylmethane, 4,4'-diisocyanato-1,1'-bi(cyclohexyl), 4,4'-diisocyanato-3,3'-dimethyl-1,1'-bi(cyclohexyl), 4,4'-diisocyanato-2,2',5,5'-tetramethyl-1,1'-bi(cyclohexyl), 1,8-diisocyanato-p-menthane, 1,3-diisocyanatoadamantane, 1,3-dimethyl-5,7-diisocyanatoadamantane, 1,3- and 1,4-bis(isocyanatomethyl)benzene (xylylene diisocyanate; XDI), 1,3- and 1,4-bis(1-isocyanato-1-methylethyl)benzene (TMXDI) and bis(4-(1-isocyanato-1-methylethyl)phenyl) carbonate, 2,4- and 2,6-diisocyanatotoluene (TDI), 2,4'- and 4,4'-diisocyanatodiphenylmethane (MDI), 1,5-diisocyanatonaphthalene and any desired mixtures of such diisocyanates. Further diisocyanates that are likewise suitable can additionally be found for example in Justus Liebigs Annalen der Chemie, volume 562 (1949) pp. 75-136.

Suitable monomeric monoisocyanates which can optionally be used in the isocyanate component A are, for example, n-butyl isocyanate, n-amyl isocyanate, n-hexyl isocyanate, n-heptyl isocyanate, n-octyl isocyanate, undecyl isocyanate, dodecyl isocyanate, tetradecyl isocyanate, cetyl isocyanate, stearyl isocyanate, cyclopentyl isocyanate, cyclohexyl isocyanate, 3- or 4-methylcyclohexyl isocyanate or any desired mixtures of such monoisocyanates. An example of a monomeric isocyanate having an isocyanate functionality greater than two which can optionally be added to the isocyanate component A is 4-isocyanatomethyloctane 1,8-diisocyanate (triisocyanatononane; TIN).

In one embodiment of the invention, the polyisocyanate A contains not more than 30% by weight, especially not more than 20% by weight, not more than 15% by weight, not more than 10% by weight, not more than 5% by weight or not more than 1% by weight, based in each case on the weight of the polyisocyanate A, of aromatic polyisocyanates. As used here, "aromatic polyisocyanate" means a polyisocyanate having at least one aromatically bonded isocyanate group.

Aromatically bonded isocyanate groups are understood to mean isocyanate groups bonded to an aromatic hydrocarbyl radical.

In a preferred embodiment of the process of the invention, a polyisocyanate A having exclusively aliphatically and/or cycloaliphatically bonded isocyanate groups is used.

Aliphatically and cycloaliphatically bonded isocyanate groups are understood to mean isocyanate groups bonded to an aliphatic hydrocarbyl radical and a cycloaliphatic hydrocarbyl radical respectively. In another preferred embodiment of the process of the invention, a polyisocyanate A consisting of or comprising one or more oligomeric polyisocyanates is used, wherein the one or more oligomeric polyisocyanates have exclusively aliphatically and/or cycloaliphatically bonded isocyanate groups.

In a further embodiment of the invention, the polyisocyanate A consists to an extent of at least 70%, 80%, 85%, 90%, 95%, 98% or 99% by weight, based in each case on the weight of the polyisocyanate A, of polyisocyanates having exclusively aliphatically and/or cycloaliphatically bonded isocyanate groups. Practical experiments have shown that particularly good results can be achieved with polyisocyanates A in which the oligomeric polyisocyanates present therein comprise exclusively aliphatically and/or cycloaliphatically bonded isocyanate groups.

In a particularly preferred embodiment of the process of the invention, a polyisocyanate A is used which consists of or contains one or more oligomeric polyisocyanates, where the one or more oligomeric polyisocyanates is/are based on 1,4-diisocyanatobutane (BDI), 1,5-diisocyanatopentane (PDI), 1,6-diisocyanatohexane (HDI), isophorone diisocyanate (IPDI) or 4,4'-diisocyanatodicyclohexylmethane (H12MDI) or mixtures thereof.

Inorganic Filler B

In order to achieve good mechanical properties of the finished component the inorganic filler B has a Mohs hardness of at least 4.0, preferably of at least 5.0 and more preferably at least 5.5. Fillers containing silicon oxide units are in accordance with the invention. These are especially silicates and quartz. It is particularly preferable when the filler B is quartz or feldspar.

High filler contents are in principle desirable to keep material costs low and to achieve good flame retardancy. However, high filler contents have the disadvantage that they increase the viscosity of the casting resins. When using polymeric MDI (pMDI) as a synthesis component of a polyurethane this is less problematic since pMDI has a viscosity of about 90-200 mPas. When pMDI is to be replaced by aliphatic isocyanates the viscosity of the casting resin more quickly reaches a processing-critical limit since oligomeric aliphatic isocyanates often have viscosities in the range of 1500 mPas or more. It is therefore necessary here to choose special fillers which in combination with aliphatic isocyanates result in low viscosities of the casting resin even at high filler contents.

The critical parameter here is the oil number. The working examples show that after storage of the reaction mixture at 60° C. for one hour a viscosity of 110 Pas was not exceeded when the oil number of the inorganic filler B was not more than 25 g/100 g. The comparative examples V6 and V7 show that even just the use of a filler which is otherwise in accordance with the invention but whose oil number is slightly above the value according to the invention resulted in high viscosities or in production of a liquid reaction mixture becoming impossible. Furthermore, a direct comparison of V4 with E10 shows that fillers containing no silicon oxide units exhibit a 40% higher viscosity after storage for one hour at 60° C. even at extremely low oil number (15 g/100 g in V4 compared to 21 g/100 g in E10).

The inorganic filler B therefore has an oil number of not more than 25 g/100 g determined according to DIN EN ISO 787-5 (October 1995), preferably not more than 22 g/100 g and more preferably not more than 20 g/100 g.

The filler may be provided with customary coatings such as for example fatty acids, silanes or titanates.

It is preferable when the casting resin consists to an extent of 30% to 90% by weight, preferably to an extent of 40% to 80% by weight, more preferably to an extent of 50% to 80% by weight and particularly preferably to an extent of 50% to 65% by weight of the inorganic filler B.

It has proven particularly advantageous that a casting resin for a highly filled material, in particular for a material having a filler content of up to 65% by weight, still exhibited a viscosity low enough for processing. The casting resin according to the invention is therefore preferably characterized in that when using up to 65% by weight of an inorganic filler according to the invention having an oil number of up to 25 g/100 g determined according to DIN EN ISO 787-5 (October 1995) said resin has a viscosity of not more than 200 Pas, preferably not more than 150 Pas, at 60° C. and this pot life is not exceeded even after at least one hour of storage at this temperature. Viscosity is determined using an MCR301Rheometer from Anton Paar. The plate/plate system PP25 with peltier heating C-PTD200 was employed with frequency f=1 Hz and amplitude gamma=5%.

In order to adhere to the parameters recited in the paragraph above it is advantageous when at 25° C. the polyisocyanate A has a viscosity of not more than 20 000 mPas, preferably not more than 10 000 mPas and more preferably not more than 5000 mPas. The viscosity is preferably at least 500 mPas.

Trimerization Catalyst C

The trimerization catalyst C may be mixed from one catalyst type or different catalyst types, but contains at least one catalyst that brings about the trimerization of isocyanate groups to isocyanurates or iminooxadiazinediones.

Suitable catalysts for the process according to the invention are, for example, simple tertiary amines, for example triethylamine, tributylamine, N,N-dimethylaniline, N-ethylpiperidine or N,N'-dimethylpiperazine. Suitable catalysts also include the tertiary hydroxyalkylamines described in GB 2 221 465, for example triethanolamine, N-methyldiethanolamine, dimethylethanolamine, N-isopropyldiethanolamine and 1-(2-hydroxyethyl)pyrrolidine, or the catalyst systems that are known from GB 2 222 161 and consist of mixtures of tertiary bicyclic amines, for example DBU, with simple low molecular weight aliphatic alcohols.

Likewise suitable as trimerization catalysts for the process of the invention are a multitude of different metal compounds. Suitable examples are the octoates and naphthenates of manganese, iron, cobalt, nickel, copper, zinc, zirconium, cerium or lead or mixtures thereof with acetates of lithium, sodium, potassium, calcium or barium that are described as catalysts in DE-A 3 240 613, the sodium and potassium salts of linear or branched alkanecarboxylic acids having up to 10 carbon atoms that are disclosed by DE-A 3 219 608, such as of propionic acid, butyric acid, valeric acid, caproic acid, heptanoic acid, caprylic acid, pelargonic acid, capric acid and undecyl acid, the alkali metal or alkaline earth metal salts of aliphatic, cycloaliphatic or aromatic mono- and polycarboxylic acids having 2 to 20 carbon atoms that are disclosed by EP-A 0 100 129, such as sodium benzoate or potassium benzoate, the alkali metal phenoxides disclosed by GB-PS 1 391 066 and GB-PS 1 386 399, such as sodium phenoxide or potassium phenoxide, the alkali metal and alkaline earth metal oxides, hydroxides, carbonates, alkoxides and phenoxides disclosed by GB 809 809, alkali metal salts of enolizable compounds and metal salts of weak aliphatic or cycloaliphatic carboxylic acids such as sodium methoxide, sodium acetate, potassium acetate, sodium acetoacetate, lead 2-ethylhexanoate, and lead naphthenate, the basic alkali metal compounds complexed with crown ethers or polyether alcohols that are disclosed by EP-A 0 056 158 and EP-A 0 056 159, such as complexed sodium carboxylates or potassium carboxylates, the pyrrolidinone potassium salt disclosed by EP-A 0 033 581, the mono- or polynuclear complex of titanium, zirconium and/or hafnium disclosed by application EP 13196508.9, such as zirconium tetra-n-butoxide, zirconium tetra-2-ethylhexanoate and zirconium tetra-2-ethylhexoxide, and tin compounds of the type described in European Polymer Journal, vol. 16, 147-148 (1979), such as dibutyltin dichloride, diphenyltin dichloride, triphenylstannanol, tributyltin acetate, tributyltin oxide, tin dioctoate, dibutyl(dimethoxy)stannane, and tributyltin imidazolate.

Further trimerization catalysts suitable for the process of the invention are, for example, the quaternary ammonium hydroxides known from DE-A 1 667 309, EP-A 0 013 880 and EP-A 0 047 452, for example tetraethylammonium hydroxide, trimethylbenzylammonium hydroxide, N,N-dimethyl-N-dodecyl-N-(2-hydroxyethyl)ammonium hydroxide, N-(2-hydroxyethyl)-N,N-dimethyl-N-(2,2'-dihydroxymethylbutyl)ammonium hydroxide and 1-(2-hydroxyethyl)-1,4-diazabicyclo[2.2.2]octane hydroxide (monoadduct of ethylene oxide and water onto 1,4-diazabicyclo[2.2.2]octane), the quaternary hydroxyalkylammonium hydroxides known from EP-A 37 65 or EP-A 10 589, for example N,N,N-trimethyl-N-(2-hydroxyethyl)ammonium hydroxide, the trialkylhydroxylalkylammonium carboxylates that are known from DE-A 2631733, EP-A 0 671 426, EP-A 1 599 526 and U.S. Pat. No. 4,789,705, for example N,N,N-trimethyl-N-2-hydroxypropylammonium p-tert-butylbenzoate and N,N,N-trimethyl-N-2-hydroxypropylammonium 2-ethylhexanoate, the quaternary benzylammonium carboxylates known from EP-A 1 229 016, for example N-benzyl-N,N-dimethyl-N-ethylammonium pivalate, N-benzyl-N,N-dimethyl-N-ethylammonium 2-ethylhexanoate, N-benzyl-N,N,N-tributylammonium 2-ethylhexanoate, N,N-dimethyl-N-ethyl-N-(4-methoxybenzyl)ammonium 2-ethylhexanoate or N,N,N-tributyl-N-(4-methoxybenzyl)ammonium pivalate, the tetrasubstituted ammonium α-hydroxycarboxylates known from WO 2005/087828, for example tetramethylammonium lactate, the quaternary ammonium or phosphonium fluorides known from EP-A 0 339 396, EP-A 0 379 914 and EP-A 0 443 167, for example N-methyl-N,N,N-trialkylammonium fluorides with C8-C10-alkyl radicals, N,N,N,N-tetra-n-butylammonium fluoride, N,N,N-trimethyl-N-benzylammonium fluoride, tetramethylphosphonium fluoride, tetraethylphosphonium fluoride or tetra-n-butylphosphonium fluoride, the quaternary ammonium and phosphonium polyfluorides known from EP-A 0 798 299, EP-A 0 896 009 and EP-A 0 962 455, for example benzyltrimethylammonium hydrogen polyfluoride, the tetraalkylammonium alkylcarbonates which are known from EP-A 0 668 271 and are obtainable by reaction of tertiary amines with dialkyl carbonates, or betaine-structured quaternary ammonioalkyl carbonates, the quaternary ammonium hydrogencarbonates known from WO 1999/023128, for example choline bicarbonate, the quaternary ammonium salts which are known from EP 0 102 482 and are obtainable from tertiary amines and alkylating esters of phosphorus acids, examples of such salts being reaction products of triethylamine, DABCO or N-methylmorpholine with dimethyl methanephosphonate, or the tetrasubstituted ammonium salts of lactams that are known from WO 2013/167404, for example trioctylammonium caprolactamate or dodecyltrimethylammonium caprolactamate.

Further trimerization catalysts C suitable in accordance with the invention can be found, for example, in J. H. Saunders and K. C. Frisch, Polyurethanes Chemistry and Technology, p. 94 ff. (1962) and the literature cited therein.

Particular preference is given to carboxylates and phenoxides with metal or ammonium ions as counterion. Suitable carboxylates are the anions of all aliphatic or cycloaliphatic carboxylic acids, preferably those with mono- or polycarboxylic acids having 1 to 20 carbon atoms. Suitable metal ions are derived from alkali metals or alkaline earth metals, manganese, iron, cobalt, nickel, copper, zinc, zirconium, cerium, tin, titanium, hafnium or lead. Preferred alkali metals are lithium, sodium and potassium, particularly preferably sodium and potassium. Preferred alkaline earth metals are magnesium, calcium, strontium and barium.

Very particular preference is given to the octoate and naphthenate catalysts described in DE-A 3 240 613, these being octoates and naphthenates of manganese, iron, cobalt, nickel, copper, zinc, zirconium, cerium or lead, or mixtures thereof with acetates of lithium, sodium, potassium, calcium or barium.

Very particular preference is likewise given to sodium benzoate or potassium benzoate, to the alkali metal phenoxides known from GB-PS 1 391 066 and GB-PS 1 386 399, for example sodium phenoxide or potassium phenoxide, and to the alkali metal and alkaline earth metal oxides, hydroxides, carbonates, alkoxides and phenoxides that are known from GB 809 809.

The trimerization catalyst C preferably contains a polyether. This is especially preferred when the catalyst contains metal ions. Preferred polyethers are selected from the group consisting of crown ethers, diethylene glycol, polyethylene glycols and polypropylene glycols. It has been found to be of particular practical relevance in the process of the invention to use a trimerization catalyst C containing, as polyether, a polyethylene glycol or a crown ether, more preferably 18-crown-6 or 15-crown-5. The trimerization catalyst C preferably contains a polyethylene glycol having a number-average molecular weight of 100 to 1000 g/mol, preferably 300 g/mol to 500 g/mol and in particular 350 g/mol to 450 g/mol.

Very particular preference is given to the combination of the above-described carboxylates and phenoxides of alkali metals or alkaline earth metals with a polyether.

It has further been found that compounds according to the formula (I) below are particularly suitable as catalysts C

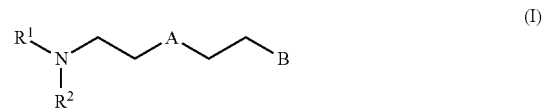

(I)

where $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl;

A is selected from the group consisting of O, S and $NR^3$ where $R^3$ is selected from the group consisting of hydrogen, methyl, ethyl, propyl, isopropyl, butyl and isobutyl; and B is independently of A selected from the group consisting of OH, SH $NHR^4$ and $NH_2$, wherein $R^4$ is selected from the group consisting of methyl, ethyl and propyl.

In a preferred embodiment, A is $NR^3$ where $R^3$ is selected from the group consisting of hydrogen, methyl, ethyl, propyl, isopropyl, butyl and isobutyl. $R^3$ is preferably methyl or ethyl. $R^3$ is more preferably methyl.

In a first variant of this embodiment, B is OH and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. $R^1$ and $R^2$ are preferably independently methyl or ethyl. $R^1$ and $R^2$ are more preferably methyl.

In a second variant of this embodiment, B is SH and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. $R^1$ and $R^2$ are preferably independently methyl or ethyl. $R^1$ and $R^2$ are more preferably methyl.

In a third variant of this embodiment, B is $NHR^4$ and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. $R^1$ and $R^2$ are preferably independently methyl or ethyl. $R^1$ and $R^2$ are more preferably methyl. In this variant, R4 is selected from the group consisting of methyl, ethyl and propyl. Preferably, R4 is methyl or ethyl. R4 is more preferably methyl.

In a fourth variant of this embodiment, B is $NH_2$ and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. $R^1$ and $R^2$ are preferably independently methyl or ethyl. $R^1$ and $R^2$ are more preferably methyl.

In a further preferred embodiment, A is oxygen.

In a first variant of this embodiment, B is OH and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. $R^1$ and $R^2$ are preferably independently methyl or ethyl. $R^1$ and $R^2$ are more preferably methyl.

In a second variant of this embodiment, B is SH and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. $R^1$ and $R^2$ are preferably independently methyl or ethyl. $R^1$ and $R^2$ are more preferably methyl.

In a third variant of this embodiment, B is $NHR^4$ and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. $R^1$ and $R^2$ are preferably independently methyl or ethyl. $R^1$ and $R^2$ are more preferably methyl. In this variant, $R^4$ is selected from the group consisting of methyl, ethyl and propyl. Preferably, R4 is methyl or ethyl. R4 is more preferably methyl.

In a fourth variant of this embodiment, B is $NH_2$ and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. $R^1$ and $R^2$ are preferably independently methyl or ethyl. $R^1$ and $R^2$ are more preferably methyl.

In yet a further preferred embodiment, A is sulfur.

In a first variant of this embodiment, B is OH and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. $R^1$ and $R^2$ are preferably independently methyl or ethyl. $R^1$ and $R^2$ are more preferably methyl.

In a second variant of this embodiment, B is SH and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. $R^1$ and $R^2$ are preferably independently methyl or ethyl. $R^1$ and $R^2$ are more preferably methyl.

In a third variant of this embodiment, B is $NHR^4$ and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. $R^1$ and $R^2$ are preferably independently methyl or ethyl. $R^1$ and $R^2$ are more preferably methyl. In this variant, $R^4$ is selected from the group consisting of methyl, ethyl and propyl. Preferably, R4 is methyl or ethyl. R4 is more preferably methyl.

In a fourth variant of this embodiment, B is $NH_2$ and $R^1$ and $R^2$ are independently selected from the group consisting of hydrogen, methyl, ethyl, propyl, isopropyl, butyl, isobutyl, branched C5-alkyl, unbranched C5-alkyl, branched C6-alkyl, unbranched C6-alkyl, branched C7-alkyl and unbranched C7-alkyl. $R^1$ and $R^2$ are preferably independently methyl or ethyl. $R^1$ and $R^2$ are more preferably methyl.

Also suitable are adducts of a compound of formula (I) and a compound having at least one isocyanate group.

The superordinate term "adduct" is to be understood as meaning urethane, thiourethane and urea adducts of a compound of formula (I) with a compound having at least one isocyanate group. A urethane adduct is particularly preferred. The adducts according to the invention are formed when an isocyanate reacts with the functional group B of the compound defined in formula (I). When B is a hydroxyl group a urethane adduct is formed. When B is a thiol group a thiourethane adduct is formed. And when B is $NH_2$ or $NHR^4$ a urea adduct is formed.

Further catalysts suitable according to the invention are phosphines of general formula (II) or mixtures of such phosphines

in which

R1, R2 and R3 are identical or different radicals and are each an alkyl or cycloalkyl group having up to 10 carbon atoms, preferably an alkyl group having 2 to 8 carbon atoms or a cycloalkyl group having 3 to 8 carbon atoms, an aralkyl group having 7 to 10 and preferably 7 carbon atoms, or an aryl group which has 6 to 10 and preferably 6 carbon atoms and is optionally substituted by alkyl radicals having up to 10 and preferably 1 to 6 carbon atoms, with the proviso that not more than one of the radicals is an aryl group and at least one of the radicals is an alkyl or cycloalkyl group, or in which R1 and R2 are aliphatic in nature and, joined to one another, together with the phosphorus atom form a heterocyclic ring having 4 to 6 ring members, where R3 is an alkyl group having up to 4 carbon atoms.

Suitable tertiary organic phosphines are, for example, tertiary phosphines having linear aliphatic substituents, such as trimethylphosphine, triethylphosphine, tri-n-propylphosphine, tripropylphosphine, dibutylethylphosphine, tri-n-butylphosphine, triisobutylphosphine, tri-tert-butylphosphine, pentyldimethylphosphine, pentyldiethylphosphine, pentyldipropylphosphine, pentyldibutylphosphine, pentyldihexylphosphine, dipentylmethylphosphine, dipentylethylphosphine, dipentylpropylphosphine, dipentylbutylphosphine, dipentylhexylphosphine, dipentyloctylphosphine, tripentylphosphine, hexyldimethylphosphine, hexyldiethylphosphine, hexyldipropylphosphine, hexyldibutylphosphine, dihexylmethylphosphine, dihexylethylphosphine, dihexylpropylphosphine, dihexylbutylphosphine, trihexylphosphine, trioctylphosphine, tribenzylphosphine, benzyldimethylphosphine, dimethylphenylphosphine or butylphosphacyclopentane.

Further tertiary organic phosphines that are suitable for the process of the invention are, for example, also the tertiary phosphines known from EP 1 422 223 A1 that have at least one cycloaliphatic radical bonded directly to phosphorus, for example cyclopentyldimethylphosphine, cyclopentyldiethylphosphine, cyclopentyldi-n-propylphosphine, cyclopentyldiisopropylphosphine, cyclopentyldibutylphosphine with any isomeric butyl radicals, cyclopentyldihexylphosphine with any isomeric hexyl radicals, cyclopentyldioctylphosphine with any isomeric octyl radicals, dicyclopentylmethylphosphine, dicyclopentylethylphosphine, dicyclopentyl-n-propylphosphine, dicyclopentylisopropylphosphine, dicyclopentylbutylphosphine with any isomeric butyl radical, dicyclopentylhexylphosphine with any isomeric hexyl radical, dicyclopentyloctylphosphine with any isomeric octyl radical, tricyclopentylphosphine, cyclohexyldimethylphosphine, cyclohexyldiethylphosphine, cyclohexyldi-n-propylphosphine, cyclohexyldiisopropylphosphine, cyclohexyldibutylphosphine, with any isomeric butyl radicals, cyclohexyldihexylphosphine with any isomeric hexyl radicals, cyclohexyldioctylphosphine with any isomeric octyl radicals, dicyclohexylmethylphosphine, dicyclohexylethylphosphine, dicyclohexyl-n-propylphosphine, dicyclohexylisopropylphosphine, dicyclohexylbutylphosphine with any isomeric butyl radical, dicyclohexylhexylphosphine with any isomeric hexyl radical, dicyclohexyloctylphosphine with any isomeric octyl radical, and tricyclohexylphosphine.

Further suitable tertiary organic phosphines for the process of the invention are, for example, also the tertiary phosphines that are known from EP 1 982 979 A1 and have one or two tertiary alkyl radicals bonded directly to phosphorus, for example tert-butyldimethylphosphine, tert-butyldiethylphosphine, tert-butyldi-n-propylphosphine, tert-butyldiisopropylphosphine, tert-butyldibutylphosphines with any isomeric butyl radicals for the non-tertiary butyl radicals, tert-butyldihexylphosphines with any isomeric hexyl radicals, but where not more than one of the hexyl radicals has a tertiary carbon atom bonded directly to phosphorus, tert-butyldioctylphosphines with any isomeric octyl radicals, but where not more than one of the octyl radicals has a tertiary carbon atom bonded directly to phosphorus, di-tert-butylmethylphosphine, di-tert-butylethylphosphine, di-tert-butyl-n-propylphosphine, di-tert-butylisopropylphosphine, di-tert-butylbutylphosphines in which the non-tertiary butyl radical may be n-butyl, isobutyl, 2-butyl or cyclobutyl, di-tert-butylhexylphosphines with any isomeric hexyl radical having no tertiary carbon atom bonded directly to phosphorus, di-tert-butyloctylphosphines with any isomeric octyl radical having no tertiary carbon atom bonded directly to phosphorus, tert-amyldimethylphosphine, tert-amyldiethylphosphine, tert-amyldi-n-propylphosphine, tert-amyldiisopropylphosphine, tert-amyldibutylphosphines with any isomeric butyl radicals, but where not more than one of the butyl radicals is tert-butyl, tert-amyldihexylphosphines with any isomeric hexyl radicals, but where not more than one of the hexyl radicals has a tertiary carbon atom bonded directly to phosphorus, tert-amyldioctylphosphines with any isomeric octyl radicals, but where not more than one of the octyl radicals has a tertiary carbon atom bonded directly to phosphorus, di-tert-amylethylphosphine, di-tert-amylethylphosphine, di-tert-amyl-n-propylphosphine, di-tert-amylisopropylphosphine, di-tert-amylbutylphosphines in which the butyl radical may be n-butyl, isobutyl, 2-butyl or cyclobutyl, di-tert-amylhexylphosphines with any isomeric hexyl radical having no tertiary carbon atom bonded directly to phosphorus, di-tert-amyloctylphosphines with any isomeric octyl radical having no tertiary carbon atom bonded directly to phosphorus, adamantyldimethylphosphine, adamantyldiethylphosphine, adamantyldi-n-propylphosphine, adamantyldiisopropylphosphine, adamantyldibutylphosphines with any isomeric butyl radicals, but where not more than one of the butyl radicals has a tertiary carbon atom bonded directly to phosphorus, adamantyldihexylphosphines with any isomeric hexyl radicals, but where not more than one of the hexyl radicals has a tertiary carbon atom bonded directly to phosphorus, adamantyldioctylphosphines with any isomeric octyl radicals, but where not more than one of the octyl radicals has a tertiary carbon atom bonded directly to phosphorus, diadamantylmethylphosphine, diadamantylethylphosphine, diadamantyl-n-propylphosphine, diadamantylisopropylphosphine, diadamantylbutylphosphines in which the butyl radical may be n-butyl, isobutyl, 2-butyl or cyclobutyl, diadamantylhexylphosphines with any isomeric hexyl radical having no tertiary carbon atom bonded directly to phosphorus, and diadamantyloctylphosphines with any isomeric hexyl radical having no tertiary carbon atom bonded directly to phosphorus.

It is preferable when the catalyst contains at least one compound from the group of the recited tertiary phosphines having linear aliphatic substituents.

Very particularly preferred phosphine catalysts are tri-n-butylphosphine and/or trioctylphosphine or mixtures thereof.

The potting compounds according to the invention make it possible to produce components of very high hardness.

The potting compound according to the invention is a one-component system. Unlike in two-component systems it is not necessary to precisely observe a stoichiometry between two reaction partners to obtain good results. Small deviations in the employed catalyst concentration in the potting compound according to the invention may result in minor variations in pot life and curing time but do not impair the properties of the finished material.

Despite the use of aliphatic polyisocyanates which intrinsically have a relatively high viscosity, the potting compounds still exhibit sufficiently low viscosities to allow processing without any major problems even at high filler contents.

In addition, the potting compounds according to the invention have a pot life of less than one hour, so that this too facilitates their processing. The potting compounds according to the invention have a pot life of at least one hour even at elevated temperatures. Thus, the combination of intrinsically low viscosity and long pot life at elevated temperature greatly facilitates the processing, in particular the deaeration, of the potting compounds according to the invention.

The potting compounds according to the invention moreover exhibit a low fire hazard compared to the known polyurethane potting compounds.

Use

In a further embodiment, the present invention provides for the use of a potting compound as defined hereinabove in this application as an electrical potting compound, i.e. for production of an electrical component.

The electrical component is preferably selected from the group consisting of transformers, insulators, capacitors, semiconductors, junction sleeves for protecting cable connections and underground cable branch tees.

Even when certain of the abovementioned electrical components may be employed without protection by an electrical potting compound in certain fields of application, the term "production of an electrical component" refers to a process in which at least one portion of an electrical component is embedded in the potting compound according to the invention. In the context of the present application a finished electrical component thus contains the potting compound according to the invention.

Process

In yet a further embodiment, the present invention provides a process for producing an electrical component containing the steps of
a) providing a casting resin having a molar ratio of isocyanate groups to isocyanate-reactive groups of at least 3:1 and a solvent content of not more than 10% by weight containing
  (i) at least one monomeric or oligomeric polyisocyanate A having an isocyanate content of at least 15% by weight;
  (ii) at least one inorganic filler B containing silicon oxide units having an oil number of not more than 25 g/100 g determined according to DIN EN ISO 787-5 (October 1995) and a Mohs hardness of at least 4; and
  (iii) at least one trimerization catalyst C;
b) potting a not yet embedded electrical component with the casting resin provided in process step a);
c) catalytic trimerization of the casting resin.

In the context of the present application the "providing" of the casting resin is to be understood as meaning only that at the end of process step a) the recited casting resin is available such that it is suitable for potting and may be catalytically trimerized.

The potting of a not yet embedded electrical component may be carried out by any processes known in the prior art for the use of potting compounds, in particular of electrical potting compounds.

The catalytic trimerization is carried out at reaction conditions under which the chosen trimerization catalyst C effects the crosslinking of isocyanate groups to afford isocyanurate groups. In the case of temperature-sensitive electrical components it is preferable to observe an upper limit for the temperature of the reaction mixture which is harmless to the relevant component.

"Catalytic trimerization" is a process in which the isocyanate groups present in the polyisocyanate A react with one another or with urethane groups already present to form at least one structure selected from the group consisting of uretdione, isocyanurate, allophanate, biuret, iminooxadiazinedione and oxadiazinetrione structures. This consumes the isocyanate groups originally present in the polyisocyanate A. The formation of the aforementioned groups results in joining of the monomeric and oligomeric polyisocyanates present in the polyisocyanate A to form a polymer network.

It is preferable when the crosslinking of the isocyanate groups present in the reaction mixture proceeds predominantly via trimerization of at least 50 mol %, preferably at least 60 mol %, particularly preferably at least 70 mol %, especially at least 80 mol % and very particularly preferably 90 mol % of the free isocyanate groups present in the polyisocyanate A to afford isocyanurate structural units. The finished polyisocyanurate material thus has corresponding proportions of the nitrogen originally present in the polyisocyanate A bound within isocyanurate structures. However, side reactions, especially those forming uretdione, allophanate and/or iminooxadiazinedione structures, do typically occur and can even be specifically utilized to advantageously influence the glass transition temperature (Tg) of the obtained polyisocyanurate material for example.

Provided that lower temperatures do not have to be observed due to temperature-sensitive components the catalytic trimerization is preferably carried out at temperatures between 50° C. and 200° C., more preferably between 80° C. and 180° C. and yet more preferably between 100° C. and 150° C.

During crosslinking of the isocyanate groups the abovementioned temperatures are maintained until at least 50 mol %, preferably at least 75 mol % and yet more preferably at least 90 mol % of the free isocyanate groups present in the semifinished product according to the invention at commencement of the crosslinking of the isocyanate groups have been consumed. The percentage of isocyanate groups still present can be determined by a comparison of the content of isocyanate groups in the isocyanate component A present at commencement of the crosslinking of the isocyanate groups with the content of isocyanate groups in the reaction product, for example by a comparison of the intensity of the isocyanate band at about 2270 $cm^{-1}$ by means of ATR-IR spectroscopy.

In a further embodiment, the present invention relates to an electrical component produced by the process defined hereinabove.

The polymer matrix formed by the casting resin is preferably characterized in that the temperature at which 5% by weight of mass loss occurs is at least 370° C., preferably at least 400° C. and most preferably at least 420° C.

The working examples which follow serve merely to illustrate the invention. They are not intended to limit the scope of the claims in any way.

EXAMPLES

Raw Materials Used

Isocyanate 1: Isocyanurate-group-containing HDI polyisocyanate produced according to example 11 of EP-A 330 966 with the exception that 2-ethylhexanol instead of 2-ethyl-1,3-hexandiol was used as the catalyst solvent. The reaction was stopped at an NCO content of the crude mixture of 42% by weight by addition of dibutyl phosphate. Subsequently, unconverted HDI was removed by thin-film distillation at a temperature of 130° C. and a pressure of 0.2 mbar.
  NCO content: 23.0% by weight
  NCO functionality: 3.2
  Monomeric HDI: 0.1% by weight
  Viscosity (23° C.): 1,200 mPas
  Density (20° C.): 1.17 $g/cm^3$
Distribution of the Oligomeric Structure Types:
  Isocyanurate: 89.7 mol %
  Iminooxadiazinedione 2.5 mol %
  Uretdione 2.7 mol %
  Allophanate: 5.1 mol %

Isocyanate 2: is an isocyanate-terminated prepolymer produced by reaction of a difunctional polypropylene glycol polyether (OH number=515 mg KOH/g) with an excess of HDI at a temperature of 80° C. After establishment of a constant NCO content the reaction was stopped by addition of dibutyl phosphate. Subsequently, unconverted HDI was removed by thin-film distillation at a temperature of 130° C. and a pressure of 0.2 mbar.

NCO content: 12.5% by weight
NCO functionality: 2.1
Monomeric HDI: <0.5% by weight
Viscosity (23° C.): 4,250 mPas
Density (20° C.): 1.10 g/cm$^3$ Isocyanate 3: is a low-viscosity mixture of diphenylmethane 4,4'-diisocyanate (MDI) with isomers and higher-functional homologues.

NCO content: 31.5% by weight
Equivalent weight: 133 g/val
Viscosity (23° C.): 90 mPas
Density (20° C.): 1.23 g/cm$^3$ Polyol 1: is a linear polypropylene ether polyol produced by propoxylation of 1,2-propanediol.

Hydroxyl number: 520 mg KOH/g
Viscosity (25° C.): 55 mPas
Density (25° C.): 1.00 g/cm$^3$ Polyol 2: Glycerol (1,2,3-propanetriol) was obtained from Calbiochem with a purity of 99.0%.

Filler 1: Silbond 126 EST is an epoxysilane-coated quartz filler and was obtained from Quarzwerke GmbH. According to the technical data sheet the filler absorbs 11 g of oil per 100 g of filler (DIN ISO 787-5); it has a Mohs hardness of 7.

Filler 2: Microdol 1-KN is a dolomite filler and was obtained from Omya. According to the technical data sheet the filler absorbs 15 g of oil per 100 g of filler (ISO 787/5). According to Wikipedia (retrieved 02-2019) the Mohs hardness of dolomite is 3.5-4.

Filler 3: Unispar PG W13 is a feldspar filler and was obtained from Sibelco. According to the technical data sheet the filler absorbs 22 g of oil per 100 g of filler (ISO 787/5); it has a Mohs hardness of 6.2.

Filler 4: Unispar PG W20 is a feldspar filler and was obtained from Sibelco. According to the technical data sheet the filler absorbs 19 g of oil per 100 g of filler (ISO 787/5); it has a Mohs hardness of 6.2.

Filler 5 Omycarb 2T-AV is a calcium carbonate filler and was obtained from Omya. According to the technical data sheet the filler absorbs 16 g of oil per 100 g of filler (ISO 787/5). According to Wikipedia (retrieved February 2019) the Mohs hardness of calcium carbonate (limestone) is 3.

Filler 6 Silbond 800 EST is an epoxysilane-coated quartz filler and was obtained from Quarzwerke GmbH. According to the technical data sheet the filler absorbs 26 g of oil per 100 g of filler (ISO 787/5).

Filler 7 Silbond 6000 MST is a methacryloylsilane-coated cristobalite filler and was obtained from Quarzwerke GmbH. According to the technical data sheet the filler absorbs 27 g of oil per 100 g of filler (ISO 787/5).

Filler 8 Sikron SF 800 is a quartz filler and was obtained from Quarzwerke GmbH. According to the technical data sheet the filler absorbs 28 g of oil per 100 g of filler (ISO 787/5).

Filler 9 Chinafill 200 is a kaolin filler and was obtained from Amberger Kaolinwerke Eduard Kick GmbH & Co. KG. According to the technical data sheet the filler absorbs 46 g of oil per 100 g of filler (ISO 787/5). According to Wikipedia (retrieved 02-2019) the Mohs hardness of kaolin is 2.5.

Filler 10 Silitin Z 86 is a mixture of corpuscular silica and lamellar kaolinite and was obtained from Hoffmann Mineral GmbH. According to the technical data sheet the filler absorbs 55 g of oil per 100 g of filler (ISO 787/5); the silica proportion has a Mohs hardness of 7 and the kaolinite proportion has a Mohs hardness of 2.5.

Filler 11 Silbond 006 MST is a methacryloylsilane-coated cristobalite filler and was obtained from Quarzwerke GmbH. According to the technical data sheet the filler absorbs 21 g of oil per 100 g of filler (ISO 787/5); it has a Mohs hardness of 6.5.

Prior to processing the fillers were dried at 80° C. for 12 hours with regular agitation.

Catalyst 1: Desmorapid AP 100 was obtained from Covestro AG.

Catalyst 2: Trioctylphosphine was obtained in a purity of 97% from abcr GmbH.

Catalyst 3: is a mixture of potassium acetate, 18-crown-6 and diethylene glycol in a ratio of 1.0:2.7:17.6 (obtained from Sigma-Aldrich in PA qualities and used as supplied).

Catalyst 4: Jeffcat Z-110 was obtained from Huntsman.

Determination of Electrical Properties:

The electrical properties of the materials were determined using a Keithley Model 8009 instrument which operates on the basis of ASTM D 257 (May 2007). The measurements were performed at 25° C.

Determination of Glass Transition Temperature:

Glass transition temperature was determined by DSC (differential scanning calorimetry) with a Mettler DSC 12E (Mettler Toledo GmbH, Gießen, Germany) instrument according to DIN EN 61006 (November 2004). Calibration was effected via the melt onset temperature of indium and lead. 10 mg of substance were weighed out in standard capsules. The measurement was effected by two heating runs from −50° C. to +200° C. at a heating rate of 20 K/min with subsequent cooling at a cooling rate of 20 K/min. Cooling was effected by means of liquid nitrogen. The purge gas used was nitrogen. The values reported are in each case based on evaluation of the 2nd heating curve.

Determination of Mass Loss:

Mass loss was determined by TGA (thermogravimetric analysis) according to DIN EN ISO 11358-1:2014-10. To this end about 5.5 mg of the product were heated from 25° C. to 600° C. in an open platinum crucible under a constant nitrogen stream in a TGA-8000 thermogravimetric analyzer (Perkin-Elmer). The heating rate was 20 K/minute. The temperature at which the mass loss accumulated over the measurement time had reached 5% by weight was evaluated.

Determination of Pot Life:

To determine pot life the two components were mixed and analyzed in a rheometer at 60° C. for one hour. The reported viscosity value was the value determined after precisely one hour. An AntonPaar MCR301 rheometer was employed. The plate/plate system PP25 with peltier heating C-PTD200 was employed.

Measurement profile: frequency f=1 Hz; amplitude gamma=5%

T=60° C., 60 min.

Determination of Shore Hardness:

Shore hardnesses were measured according to DIN 53505 (August 2000) using a Zwick 3100 Shore hardness tester (from Zwick) at 23° C. and 50% atmospheric humidity.

Comparative Tests:

| ON | | EHL 11-79/24 V 1 | EHL 11-73/25-1 V 2 | EHL 11-73/35 V 3 | EHL 11-73/36 V 4 | EHL 11-73/25 V 5 | EHL 11-73/42 V 6 | EHL 11-73/44 V 7 | EHL 11-73/30 V 8 | EHL 11-73/45 V 9 | EHL 11-73/41 V 10 |
|---|---|---|---|---|---|---|---|---|---|---|---|
| | Isocyanate 1 | — | 35 g | 35 g | 35 g | 35 g | 35 g | 35 g | 35 g | 35 g | 35 g |
| | Isocyanate 3 | 25.8 g | — | — | — | — | — | — | — | — | — |
| | Polyol 1 | 4.58 g | — | — | — | — | — | — | — | — | — |
| | Polyol 2 | 4.58 g | — | — | — | — | — | — | — | — | — |
| 11 | Filler 1 | 65 g | — | — | — | — | — | — | — | — | — |
| 15 | Filler 2 | — | 65 g | 65 g | 65 g | — | — | — | — | — | — |
| 16 | Filler 5 | — | — | — | — | 65 g | — | — | — | — | — |
| 26 | Filler 6 | — | — | — | — | — | 65 g | — | — | — | — |
| 27 | Filler 7 | — | — | — | — | — | — | 65 g | — | — | — |
| 28 | Filler 8 | — | — | — | — | — | — | — | 65 g | — | — |
| 46 | Filler 9 | — | — | — | — | — | — | — | — | 65 g | — |
| 55 | Filler 10 | — | — | — | — | — | — | — | — | — | 65 g |
| | Catalyst 1 | — | 1.49 g | — | — | 1.49 g | — | — | 1.49 g | — | — |
| | Catalyst 2 | — | — | 0.18 g | — | — | — | — | — | — | — |
| | Catalyst 3 | — | — | 1.05 g | — | — | — | — | — | — | — |
| | Catalyst 4 | — | — | — | 0.09 g | — | 0.09 g | 0.09 g | — | 0.09 g | 0.09 g |
| | Viscosity after 1 h at 60° C. | ** | 312 Pas | 173 Pas | 139 Pas | 213 Pas | ** | 209 Pas | ** | ** | ** |

** In these experiments the fillers were not able to be processed into a liquid mixture with the other input materials. The viscosity therefore could not be determined.

Inventive Experiments:

| ON | | EHL 11-73/7-3 E 1 | EHL 11-73/13 E 2 | EHL 11-73/15-1 E 3 | EHL 11-73/17-1 E 4 | EHL 11-73/27-2 E 5 | EHL 11-73-28-3 E 6 | EHL 11-73-37 E 7 | EHL 11-73-38 E 8 | EHL 11-73-39 E 9 | EHL 11-73-40 E 10 | EHL 11-73-43 E 10 |
|---|---|---|---|---|---|---|---|---|---|---|---|---|
| | Isocyanate 1 | 35 g | 35 g | 35 g | 28 g | 35 g | 35 g | 35 g | 35 g | 35 g | 35 g | 35 g |
| | Isocyanate 2 | — | — | — | 7 g | — | — | — | — | — | — | — |
| 11 | Filler 1 | 65 g | 65 g | 65 g | 65 g | 65 g | 65 g | — | — | — | — | — |
| 22 | Filler 3 | — | — | — | — | — | — | 65 g | 65 g | — | — | — |
| 19 | Filler 4 | — | — | — | — | — | — | — | — | 65 g | 65 g | — |
| 21 | Filler 11 | — | — | — | — | — | — | — | — | — | — | 65 g |
| | Catalyst 1 | 1.49 g | — | 1.49 g | 1.49 g | — | — | 1.49 g | — | 1.49 g | — | — |
| | Catalyst 2 | — | 0.18 g | 0.18 g | — | — | — | — | — | — | — | — |
| | Catalyst 3 | — | 1.05 g | — | — | — | — | — | — | — | — | — |
| | Catalyst 4 | — | — | — | — | 0.09 g | 0.18 g | — | 0.09 g | — | 0.09 g | 0.09 g |
| | Viscosity after 1 h at 60° C. | 72 Pas | 79 Pas | 86 Pas | 92 Pas | 46 Pas | 48 Pas | 94 Pas | 43 Pas | 40 Pas | 25 Pas | 102 Pas |

All test specimens were cured within 30 minutes in an oven at 180° C.

Properties of the Cured Test Specimens:

| | EHL 11-73/24 V | EHL 11-73/7-3 E1 | EHL 11-73/13-1 E2 | EHL 11-73/15-1 E3 | EHL 11-71/17-1 E4 | EHL 11-73/25-1 E5 | EHL 11-73/27-2 E6 | EHL 11-73/28-3 E7 |
|---|---|---|---|---|---|---|---|---|
| Glass transition | — | 102 | 85 | 100 | 76 | 79 | 77 | 108 |
| Shore hardness D | — | 84 | 82 | 84 | 72 | 74 | 83 | 83 |
| Relative permittivity | — | 3.48 | 3.13 | 3.88 | 3.56 | 4.88 | 3.43 | 3.29 |
| Loss factor at 100 Hz | — | $1.87 \times 10^{-2}$ | $1.62 \times 10^{-2}$ | $2.21 \times 10^{-2}$ | $2.76 \times 10^{-2}$ | $9.77 \times 10^{-2}$ | $1.07 \times 10^{-2}$ | $9.72 \times 10^{-3}$ |
| Temperature at 5% by weight mass loss [° C.] | — | 464 | 436 | 470 | 394 | 427 | 445 | 479 |

The invention claimed is:

1. A process for producing an electrical component comprising
   a) providing a casting resin;
   b) potting a not yet embedded electrical component with the casting resin provided in process step a);
   c) catalytically trimerizing isocyanate groups of the casting resin,
   the casting resin having a molar ratio of isocyanate groups to isocyanate-reactive groups of at least 3:1 and a solvent content of not more than 10% by weight, wherein the casting resin comprises
      (i) at least one monomeric or oligomeric polyisocyanate A having an isocyanate content of at least 15% by weight;
      (ii) at least one inorganic filler B containing silicon oxide units having an oil number of not more than 25 g/100 g determined according to DIN EN ISO 787-5 (October 1995) and a Mohs hardness of at least 6; and
      iii) at least one trimerization catalyst C,
   wherein the casting resin has a viscosity of up to 102 Pas after 1 hour at 60° C.

2. The process of claim 1, wherein the polyisocyanate A comprises at least 70% by weight of polyisocyanates having exclusively aliphatically and/or cycloaliphatically bonded isocyanate groups based on a total weight of polyisocyanate A.

3. The process of claim 1, comprising at least 30% by weight of the inorganic filler B.

4. The process of claim 3, comprising at least 65% by weight of the inorganic filler B.

5. The process of claim 1, wherein the trimerization catalyst C catalyzes crosslinking of isocyanate groups to afford isocyanurate groups.

6. The process of claim 1, wherein, at a content of up to 65% by weight of the inorganic filler B, said casting resin has a viscosity of not more than 150 Pas after storage for one hour at 60° C.

7. The process of claim 6, wherein the polyisocyanate A has a viscosity of at least 500 mPas and not more than 20 000 mPas at 25° C.

8. A casting resin having a molar ratio of isocyanate groups to isocyanate-reactive groups of at least 3:1 and a solvent content of not more than 10% by weight, wherein the casting resin comprises
   (i) at least one monomeric or oligomeric polyisocyanate A having an isocyanate content of at least 15% by weight;
   (ii) at least one inorganic filler B containing silicon oxide units having an oil number of not more than 25 g/100 g determined according to DIN EN ISO 787-5 (October 1995) and a Mohs hardness of at least 6; and
   (iii) at least one trimerization catalyst C,
   wherein the casting resin has a viscosity of up to 102 Pas after 1 hour at 60° C.

9. An electrical component produced by the process as claimed in claim 1.

10. The electrical component as claimed in claim 9, wherein the polymer matrix formed by the cured casting resin is characterized in that a temperature at which 5% by weight of mass loss occurs is at least 370° C.

11. The electrical component as claimed in claim 9, wherein the electrical component is a transformer, insulator, capacitor, semiconductor, junction sleeve for protecting cable connections, or an underground cable branch tee.

* * * * *